ABBOTT L. ROTCH
INVENTOR.

BY
ATTORNEYS

ABBOTT L. ROTCH
INVENTOR.

ABBOTT L. ROTCH
INVENTOR

United States Patent Office 3,432,725
Patented Mar. 11, 1969

3,432,725
ELECTRIC DISCHARGE SYSTEM HAVING AUTOMATICALLY CONTROLLED POWER SUPPLY
Abbott L. Rotch, Milton, Mass., assignor to EG & G, Inc., Bedford, Mass., a corporation of Massachusetts
Filed July 1, 1966, Ser. No. 562,306
U.S. Cl. 315—241    9 Claims
Int. Cl. H05b 37/02, 41/14

ABSTRACT OF THE DISCLOSURE

An electric power supply system for charging capacitor banks employed to ignite a flashtube. Gated semiconductor switch devices are connected between the AC input and a power transformer. Relaxation oscillator type timing circuits utilizing unijunction transistors control the conductivity of the gated semiconductor switch devices. Circuitry is provided to establish an initial timing cycle when the capacitive load first commences charging. A feedback circuit modifies the timing cycle as the capacitive load charges. A regulator circuit also controls the timing circuits to prevent conduction of the gated semiconductor switch devices when certain conditions exist in the capacitive load.

---

This invention relates to electric discharge systems, and more particularly to power supplies for electric discharge devices and other loads and to circuits for charging capacitors. The invention is especially concerned with a system for charging a capacitor bank at a substantially constant rate and for turning off the power supply when the capacitors have been charged to the desired potential. In one embodiment of the invention the power supply is turned off for a predetermined period after discharge of the capacitors (to prevent continuous ionization of an electric-discharge flash device, for example) and is turned off in the event of a substantial unbalance between positive and negative sections of the capacitor banks.

In electric flash-producing systems, and particularly in flash-producing systems employed in aerial photoreconnaissance, an efficient, compact, light-weight, and reliable power supply is needed. Patent No. 2,977,509, issued to Barstow et al. on Mar. 28, 1961, and assigned to the same assignee as the present invention, describes and claims an electric-discharge system for the production of flashes of light, as in aerial flash photography, stroboscopic applications and the like. The apparatus described in the said patent includes safety, hold-off, voltage-level-regulating and charging rate features and utilizes a magnetic amplifier for performing various control functions.

A principal object of the present invention is to provide an improved electric-discharge system and especially improved power supply apparatus of higher efficiency, lighter weight, and smaller size than comparable known apparatus utilizing magnetic amplifiers, saturable reactors, or resonant charging circuits, for example.

Another object of the invention is to provide an improved solid-state power supply for providing energy to electric flash-producing discharge devices.

A further object of the invention is to provide an improved power supply system.

An additional object of the invention is to provide an improved system for charging capacitors at a predetermined (preferably constant) rate, in which the charging rate is controlled as a function of the charge upon the capacitors and in which the power supply is turned off when the capacitors are charged to the desired potential.

Briefly stated, the apparatus of the invention comprises capacitor means capable of being charged to supply electric energy to a flash-producing discharge device when the latter is triggered. A transformer is connected to the capacitors by rectifier means. A gated electric switch such as a controlled rectifier configuration is associated with the primary of the transformer. The controlled rectifiers are rendered conductive in sequence, passing controlled rectifier current from the AC input terminals. The conductivity of the controlled rectifiers is controlled by a corresponding timing circuit which has an initial timing cycle determined by a level-setting circuit and which has a feedback loop connected to it so that its timing cycle is modified progressively in response to charging of the capacitors, in order to vary the delay angle of the controlled rectifiers and thereby to maintain a predetermined charging rate. A regulator circuit is connected to the timing circuit and controls the timing circuit to turn off the power supply when the capacitors are charged to the desired potential. In one embodiment the regulator circuit can also maintain the power supply turned off for a predetermined time after discharge of the capacitors and can also turn off the power supply in the event of substantial unbalance between positive and negative sections of the capacitor bank.

The foregoing and other objects, advantages, and features of the invention will become more readily apparent upon consideration of the following detailed description of the invention taken in conjunction with the accompanying drawings, which illustrate two embodiments, and wherein.

Figure 2:
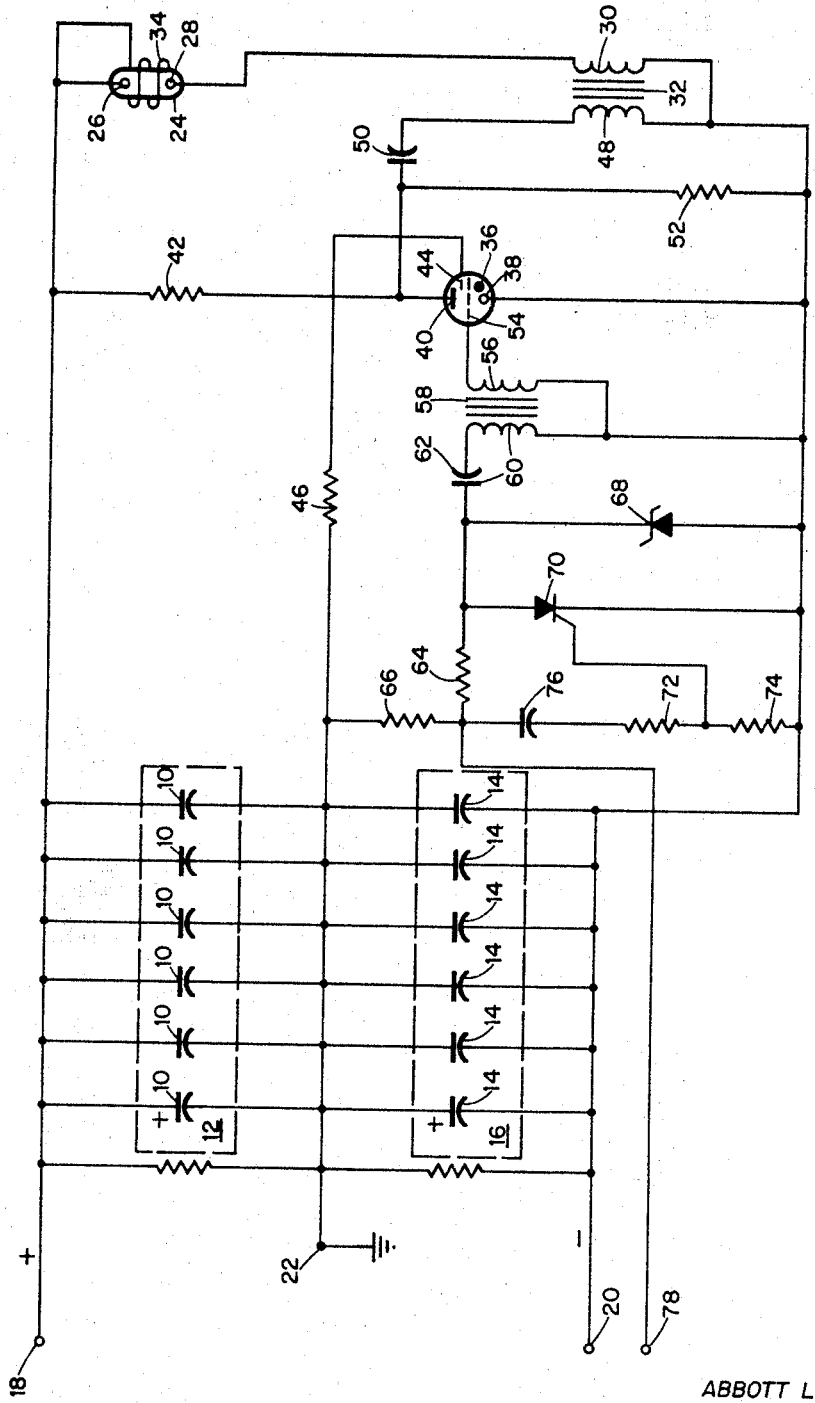
FIGURE 2 is a schematic diagram illustrating capacitor banks and associated flash-producing circuitry for use with the embodiment of FIGURE 1.

Referring initially to FIG. 2, capacitors 10 are connected in parallel to form a positive bank 12, while similar capacitors 14 are connected in parallel to form a negative bank 16. The capacitor banks are connected in series to provide a high voltage (for example, of the order of 900 volts) between the positive terminal 18 and the negative terminal 20. The junction of the capacitor banks at terminal 22 may be grounded, as by connecting it to the chassis or to an actual earth ground.

The charge stored upon the capacitor banks, as will be described, may be employed to ignite a flash-producing electric discharge device 24, such as the type FX–89 flashtube marketed by EG & G, Inc. The anode 26 of the tube is connected to the positive terminal 18, while the cathode 28 is connected through the secondary winding 30 of a trigger transformer 32 to the negative terminal 20. A trigger electrode 34 is also connected to anode 26.

The illustrative triggering circuit comprises a gaseous discharge tube 36, such as a type KN2, having a cathode 38 connected to the negative terminal 20, an anode 40 connected to the positive terminal 18 through a resistor 42, and a keep-alive electrode 44 connected to the ground terminal 22 by a resistor 46. The primary winding 48 of transformer 32 has one side connected to the negative terminal 20 and the other side connected to one side of a capacitor 50, the other side of which is connected to the anode 40 of the discharge tube 36 and to the junction of resistor 42 and another resistor 52 connected between the positive terminal 18 and the negative terminal 20.

Tube 36 has a control grid 54 connected to one side of the secondary winding 56 of transformer 58, the other side of which is connected to the negative terminal 20. The primary winding 60 has one side connected to negative terminal 20 and the other side connected to one side of a capacitor 62, the other side of which is connected through resistors 64 and 66 to ground terminal 22. A Zener diode 68 is connected across capacitor 62 and winding 60 and limits the potential to which capacitor 62 may be charged through resistors 64 and 66 from negative bank 16.

A controlled rectifier, such as SCR 70, has its anode connected through resistors 64 and 66 to ground terminal 22 and its cathode connected to negative terminal 20. Its gate electrode is connected to the junction of a pair of resistors 72 and 74 connected in series with coupling capacitor 76 between trigger signal input terminal 78 and negative terminal 20.

The circuit of FIG. 2 operates conventionally. The potential attained by capacitor banks 12 and 16 normally insufficient to break down flashtube 24 until it is triggered. This occurs when a positive triggering pulse applied from terminal 78 to the gate electrode of SCR 70 causes the SCR to conduct, discharging capacitor 62 through the SCR and the primary winding 60, triggering gaseous discharge tube 36, and causing capacitor 50 to discharge through tube 36 and primary winding 48 of transformer 32. The voltage pulse induced in secondary winding 30 adds to the voltage across capacitor banks 12 and 16. Sufficient gas is ionized in flashtube 24 between trigger electrode 34 and cathode 28 for the flashtube to break down and for capacitor banks 12 and 16 to discharge between anode 26 and cathode 28 creating a brilliant flash of light. The system for charging capacitors 10 and 14 in accordance with the invention will now be described.

Figure 1:
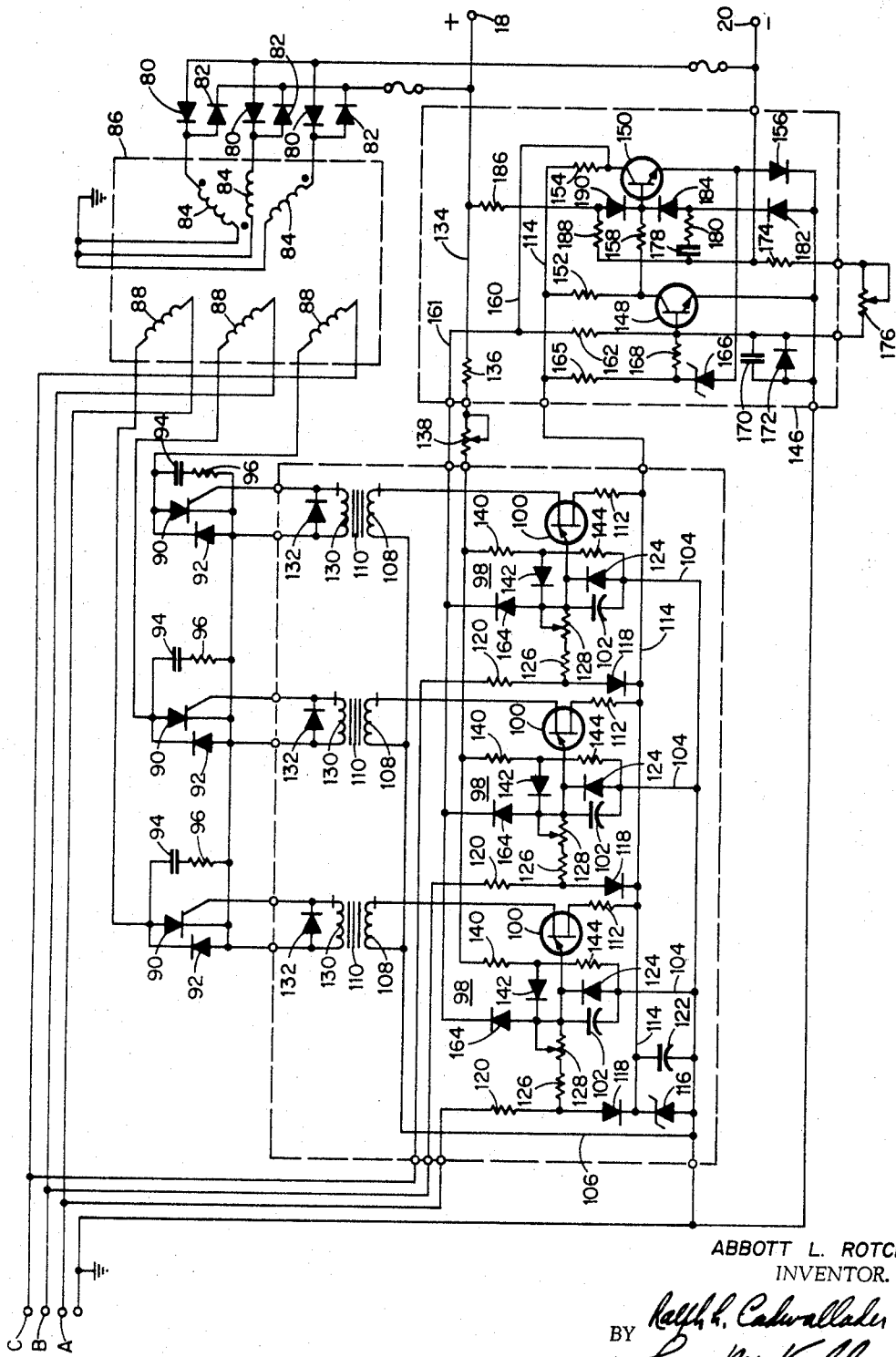
FIGURE 1 is a schematic diagram of a polyphase embodiment of power supply apparatus in accordance with the invention.

Referring to FIG. 1, positive terminal 18 and negative terminal 20 are the same terminals described in connection with FIG. 2. These terminals are connected by oppositely poled rectifiers 80 and 82 to the secondary windings 84 of a three-phase power transformer 86. In the form shown the secondary windings are Y-connected, one side of each winding being grounded and the other side of each winding being connected to the rectifiers 80 and 82. The primary windings 88 of the power transformer have one side connected to corresponding three-phase AC input terminals A, B, C respectively.

The polarity of the secondary windings, indicated by the dot notation, show that one of the secondary windings has a dotted side grounded while the other two secondary windings have the undotted side grounded. This reversal of one of the secondary windings is necessary to compensate for unbalance that might exist because of an unsymmetrical input voltage waveform. For example, if the positive half-cycle of the input voltage waveform is of a greater amplitude than the negative half-cycle the positive and negative capacitor banks will display a voltage unbalance. By reversing one of the secondary windings the voltage waveform in that secondary winding has a negative half-cycle of greater amplitude than the positive half-cycle. This will tend to cancel unbalances appearing in the input voltage waveform.

Associated with each primary winding is a gated electric switch, such as an SCR 90. These controlled rectifiers are connected to one end of the corresponding winding 88 with the same polarity, and each is bridged by diode 92 with opposite polarity. Each is also bridged by a small capacitor 94 and resistor 96 in series to ensure that the SCR's will turn on under the existing inductive load conditions. As will be seen hereinafter, switches 90 are rendered conductive sequentially. When any such switch is conductive, current will flow from the corresponding AC input terminal, through the associated primary winding 88 and the conductive switch 90, through the diodes 92 associated with the other two phases, and through the other two primary windings to the remaining input terminals. Thus, the current return path for each phase is through the other two phases and the use of the oppositely poled diodes 92 provides an approximation of full-wave operation without the complexity of an additional controlled rectifier for each phase. By employing gated switches 90 in the primary circuit of transformer 86 relatively low-voltage inexpensive SCR devices may be utilized.

The triggering of gated switches 90 is controlled by corresponding timing circuits 98. Each timing circuit comprises unijunction transistor 100 connected as a relaxation oscillator. Each unijunction transistor 100 has capacitor 102 connected to its emitter and through conductors 104 and 106 and the primary winding 108 of transformer 110 to its base-one electrode. Its base-two electrode is connected through resistor 112 to a supply line 114. This line has a potential regulated by Zener diode 116 and supplied by diodes 118 connected through resistors 120 to respective polyphase input terminals A, B, C. The potential is filtered by capacitor 122 connected across Zener diode 116 from line 114 to ground.

The cycle of the timing oscillators is determined by the time required for capacitors 102 to charge to the firing point of unijunction transistors 100. Assuming for the moment that main capacitor banks 12 and 16 have no charge, the potential applied to capacitors 102 will be determined by the clipping level of Zener diode 116 for the postive half-cycles of the input potential, diodes 124 bridged across capacitors 102 passing the negative half-cycles to prevent charging of the capacitors in the reverse direction. Thus, initially capacitors 102 are charged by current flowing through resistors 126 and variable resistors 128. Triggering potentials are applied to the gated switches 90 from the secondary windings 130 of transformers 110 bridged by protective diodes 132. Each of the gated switches 90 will be rendered conductive with a delay angle determined by the time for the capacitors 102 to charge to the firing point of unijunction transistors 100 and will remain conductive until the polarity of the applied AC reverses.

In order to obtain efficient charging of the capacitor banks, it is desired that the delay angle for the switches 90 be reduced progressively as the capacitor banks charge. Preferably, as will become more clearly apparent from the theoretical discussion hereinafter, this will cause the charging current to remain substantially constant as the capacitor banks charge. The desired result is attained in accordane with the invention by connecting one of the capacitor banks in a feedback loop with the timing circuits, so that each time a unijunction transistor 100 fires and renders a gated switch 90 conductive, the resulting increment of charge in the capacitor banks will be reflected in the feedback loop to modify the cycle of the timing oscillators and to maintain the charging period substantially constant.

In the form shown the feedback connection is obtained from positive capacitor bank 12, positive terminal 18 being connected by conductor 134 through resistor 136, variable resistor 138, resistors 140 and diodes 142 to the emitters of unijunction transistors 100. Resistors 140 and 144 form a voltage divider. The emitters of unijunction transistors 100 constitute a current summing point to which the timing capacitors 102 are connected. The initial operating condition of the timing circuits established by the clipping level of Zener diode 116 is modified by the current which flows from positive terminal 18 into capacitors 102 as capacitor banks 12 and 16 charge. Thus, as the capacitor banks charge, the potential upon timing capacitors 102 will reach the unijunction firing points more rapidly, and the delay angle for switches 90 will be reduced accordingly. Initial charging rate can be established by adjusting resistors 128 with the capacitor banks short-circuited. Then by adjusting resistor 138 the desired constant charging rate may be provided.

If it is assumed that the change in the capacitor bank voltage is essentially negligible during the charging period of each positive half-cycle, the input current will be determined largely by the charging time and the inductance and resistance in the circuit. In a flash-producing system the capacitance of the bank capacitors is quite large and initially the capacitors are essentially a short circuit across the secondary windings of the power transformer. The resistance in the circuit is determined largely by equivalent series resistances and by circuit losses. Thus, in a practical application the input current is controlled by selecting the inductance of the circuit, which in the form shown is essentially the primary leakage inductance of the transformer, and by determining the value of the charging period to provide the desired current input to the capacitors. If the charging period is made quite short, then the inductance can be made quite small. On the other hand, if the charging period is larger, a larger inductance is required in order to provide the same integrated current into the capacitors. The advantage of employing a short charging period is that the inductance can be made small in size, but the disadvantage is that the peak current becomes correspondingly higher. A compromise can be reached in the light of existing requirements.

When the potential of the capacitor bank is zero, initially, the delay angle can be quite large, so that switches 90 turn on at a time close to the point where the input AC waveform descends to and crosses the zero axis. However, as the capacitors charge and their voltage increases, the delay angle must be progressively reduced so that charging current flows earlier in the waveform and at a higher potential. If the delay angle is reduced so as to maintain the charging period substantially constant for successive positive half-cycles of the input waveform, an essentially constant charging current will be applied to the capacitors. This current will have generally a half-sinusoidal wave shape.

By virtue of the feedback connection along conductor 134 from the positive capacitor bank, the rate of charging of the capacitor banks is controlled. Because the initial charging rate is set by the clipping level of Zener diode 116 and by variable resistors 128, and hence is limited, the power supply can never "run away," even if a short circuit is present in the capacitor banks. In accordance with the invention a feedback circuit is also established to turn off the power supply when the capacitor banks have been charged to the desired level, to maintain the power supply turned off for a predetermined period after discharge of the capacitors, and to turn off the power supply if the voltages upon the positive and negative banks are unbalanced to a predetermined degree. These functions are performed by a simple semiconductor relay circuit constituting a regulator 146.

Regulator 146 comprises a two-stage amplifier including transistor 148 and transistor 150. A suitable collector supply is provided from supply line 114 and is regulated by Zener diode 116. Resistors 152 and 154 connect the collectors of transistors 148 and 150 respectively to supply line 114. The emitter of transistor 148 is connected to ground and the emitter of transistor 150 is connected to ground through diode 156. The collector of transistor 148 is connected to the base of transistor 150 by resistor 158, and a regenerative feedback connection from the collector of transistor 150 is provided through conductor 160 and resistor 162 to the base of transistor 148. An output connection is provided by conductor 160 and conductor 161 through diodes 164 to the emitters of unijunction transistors 100.

A reference base current for transistor 148 is established by resistor 165, Zener diode 166, and diode 156 connected in series between supply line 114 and ground, the junction of resistor 165 and Zener diode 166 being connected through resistor 168 to the base of transistor 148. A network including condenser 170 bridged by diode 172 and connected between the base of transistor 148 and ground provides noise protection. The base of transistor 148 is connected to negative terminal 20 by resistor 174 in series with variable resistor 176 in order to control the regulator in response to the potential upon the negative bank. Hold-off control is provided by condenser 178 connected in series with resistor 180 and diode 182 from the negative terminal 20 to ground for charging and connected in series with resistor 180 and diode 184 from the negative terminal to the base of transistor 150 for discharging. Unbalance control is provided by resistor 186 and resistor 188 respectively connected from positive terminal 18 and the negative terminal 20 through diode 190 to the base of transistor 150.

In the operation of regulator 146, as the capacitor banks charge and the terminal 20 becomes more negative, the circuit including resistors 174 and 176 by-passes more of the base current of transistor 148, which is normally on. Finally, when negative capacitor bank 16 has been charged to the desired level, transistor 148 will be turned off. When this occurs, the base current through resistor 158 to the base of transistor 150 will be sufficient to turn on transistor 150, which is normally off, and this effect will enhanced by the feedback connection through conductor 160 and resistor 162, which controls the hysteresis of the circuit. When transistor 150 is turned on, the current flowing through diodes 164 in the timing circuits and through conductors 161 and 160 will be sufficient to prevent timing capacitors 102 from charging to the firing point of unijunction transistors 100. Hence, switches 90 will not be rendered conductive, and the power supply will thus be turned off.

When the capacitor banks are discharged, as by flashing of flashtube 24, condenser 178, which charged during the charging of the capacitor banks, will now discharge through resistor 180 and diode 184 to provide sufficient base current to maintain transistor 150 on, and hence to maintain the power supply off for a period of time long enough to ensure complete deionization of flashtube 24 before recharging of the capacitor banks.

As previously mentioned the lack of symmetry of the primary circuitry, including switches 90 and bridging diodes 92 for the positive and negative half-cycles of the supply waveform, can be compensated for by the reversal of one of the secondary windings. If, however, a significant, substantial unbalance occurs (as for example, a short circuit in the negative bank or a component failure) and the negative potential is appreciably less than the positive potential, diode 190 will conduct (because of the unbalance of the positive and negative potentials applied through resistors 186 and 188), and the resulting current to the base of transistor 150 will be sufficient to turn on the transistor and turn off the power supply.

Thus, timing circuits 98 are controlled by feedback from the capacitor banks (directly from the positive terminal 18 and indirectly through the regulator circuit 146) to ensure that the desired operating conditions are maintained. The control functions are accomplished in a simple, efficient, and reliable manner.

Typical circuit component types or values are as follows:

| Components: | Type or value |
|---|---|
| Unijunctions 100 | 2N489 |
| Transistors 148 and 150 | 2N697 |
| SCR's 90 | 2N688 |
| Diodes 92 | 1N2158 |
| Zener diode: | |
| 116 | 1N1739 |
| 166 | 1N755A |
| Diodes: | |
| 190 | 1N649 |
| 80 and 82 | 1N2369B |
| Other diodes | 1N4868 |
| Resistors: | |
| 126 ohms | 3300 |
| 128 | 50K |
| 140 | 100K |
| 144 | 12K |
| 164 | 7K |
| 112 ohms | 330 |

| Component: | Type or value |
|---|---|
| Resistor: | |
| 96 _____do____ | 39 |
| 136 _____ | 33K |
| 138 _____ | 100K |
| 186 _____ | 240K |
| 164 _____ohms__ | 5600 |
| 162 _____ | 510K |
| 168 _____ | 10K |
| 152 _____ | 15K |
| 188 _____ | 220K |
| 158 _____ohms__ | 8200 |
| 180 _____ | 100K |
| 174 _____ | 470K |
| 176 _____ | 250K |
| 154 _____ | 15K |
| Condensers: | |
| 94 _____microfarads__ | 0.1 |
| 102 _____do____ | .047 |
| 122 _____do____ | 10 |
| 170 _____do____ | 3.3 |
| 178 _____do____ | 0.47 |

Figure 3:
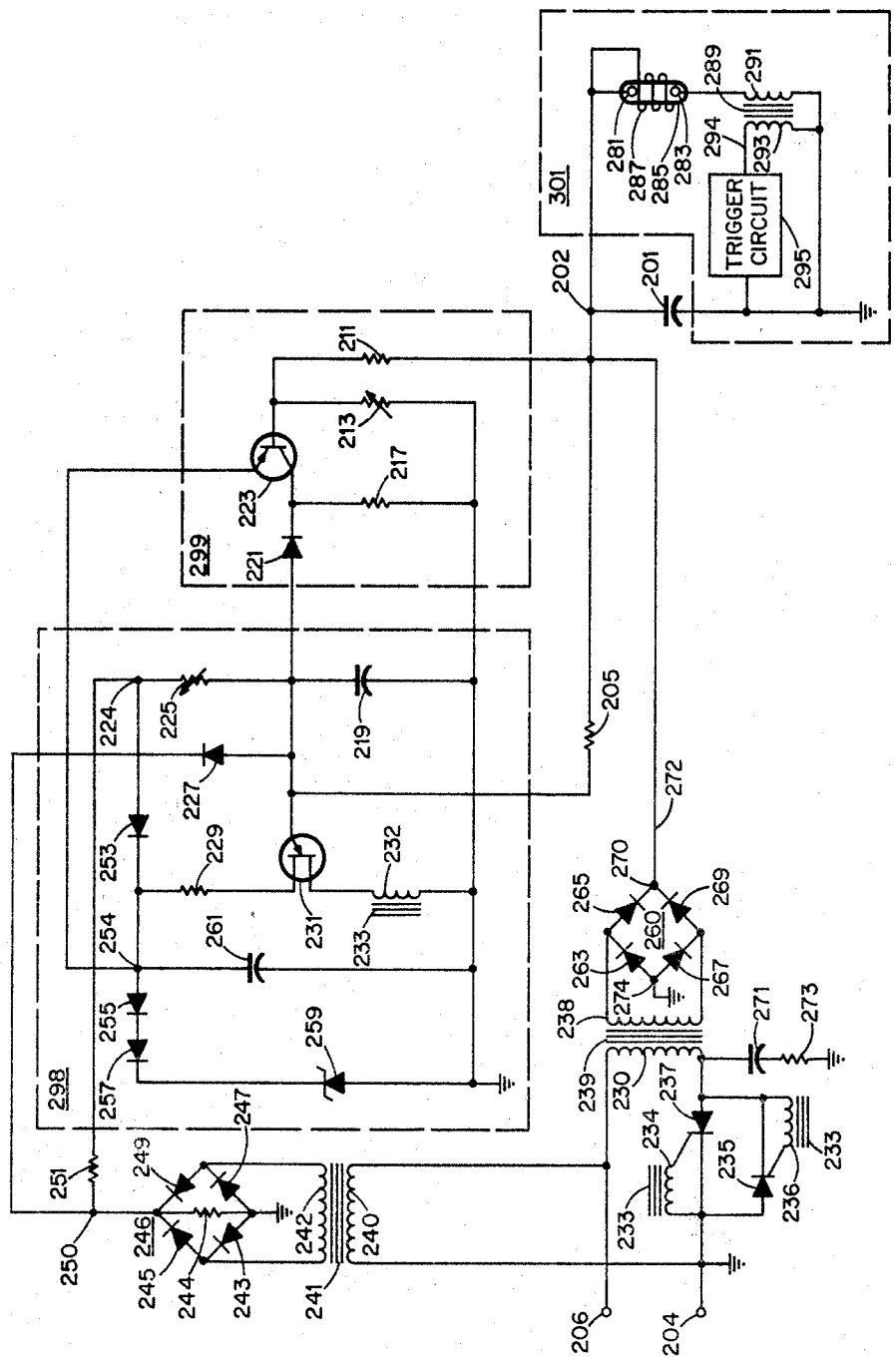
FIGURE 3 is a schematic diagram of a single phase embodiment of power supply apparatus with associated flash-producing circuitry.

Referring to FIGURE 3, a single phase embodiment of the invention is disclosed with capacitor 201 being charged during both positive and negative half-cycles. Single phase AC power, connected between terminal 204 and terminal 206, is applied directly to primary winding 240 of transformer 241. Transformer 241 is a step-down transformer with fullwave rectifier bridge 246 connected across secondary winding 242. Diodes 243, 245, 247 and 249 combine in the conventional manner to comprise full-wave rectifier bridge 246. Output resistor 244, which is connected between node 250 and ground, and resistor 251, which is connected between node 250 and node 224, are connected in series and limit the current drawn from full-wave bridge 246. Transformer 239, unlike transformer 241, is a step-up transformer with a relatively large turns ratio. Full-wave rectifier 260 is connected to secondary winding 238 and is comprised of diodes 263, 265, 267 and 269 connected in the conventional manner. Connected in series with primary winding 230 of transformer 239 is a gated electric switch comprised of the parallel combination of silicon controlled rectifiers 235 and 237. During the charging of capacitor 201 silicon controlled rectifiers 235 and 237 are alternately turned on during both positive and negative half-cycles of the single phase AC power, as hereinafter explained.

The triggering of the gated electric switches 235 and 237 is controlled by timing circuit 298. Timing circuit 298 comprises a unijunction 231 connected as a relaxation oscillator. As previously mentioned the waveform appearing at node 250 and node 224 is fully rectified. Zener diode 259 in series with diodes 255 and 257 determine the positive voltage swing of node 254. Connected from node 254 to ground across the series combination of Zener diode 259 and diodes 255 and 257 is filter capacitor 261 which stabilizes the voltage at node 254 such that node 254 is essentially at a constant DC positive reference voltage.

Variable resistor 225 is connected from node 224 to the emitter of unijunction 231. Capacitor 219 which is connected from the emitter of unijunction 231 to ground charges through variable resistor 225 during each half-cycle. When the voltage across capacitor 219 reaches the unijunction firing voltage unijunction 231 conducts. When this conduction occurs a voltage pulse appears in primary 232 of transformer 233, said primary connected from the base-two electrode of unijunction 231 to ground. Diode 253, whose anode is connected to node 224 and whose cathode is connected to node 254, reverse biases when the voltage at node 224 goes toward ground preventing capacitor 261 from discharging. Diode 227, whose cathode is connected to node 250 and whose anode is connected to the emitter of unijunction 231, is reverse biased during the time capacitor 219 is charging. As capacitor 219 discharges diode 227 will forward bias, providing an additional discharge path through diode 227 and resistor 224 to ground. This assures that the initial voltage on capacitor 219 is the same for each half-cycle of operation. Resistor 229 connected from base-one of unijunction 231 to node 254 is the load resistor for unijunction 231.

In order to obtain efficient charging of capacitor 201 it is desired that the delay angle of silicon controlled rectifiers 235 and 237 be reduced progressively as capacitor 201 charges. When the potential of capacitor 201 is zero, initially, the delay angle can be quite large, so that the silicon controlled rectifiers turn on at a time close to the point where the input AC waveform descends to and crosses the zero axis. However, as capacitor 201 charges and the voltage increases, the delay angle must be progressively reduced so that charging current flows earlier in the waveform and at a higher potential. Therefore, by reducing the delay angle the charging period is substantially constant as is the charging current.

This desired result is attained in accordance with the invention by connecting a feedback loop comprising resistor 205 from node 202 to the emitter of unijunction 231. The emitter of the unijunction constitutes a current summing point to which the timing capacitor 219 is connected. The initial operating condition of the timing circuit established by the clipping level of Zener diode 259 is modified by the current which flows from node 202 into the emitter of unijunction 231 as capacitor 201 charges. Thus, as capacitor 201 charges, the potential upon timing capacitor 219 will reach the unijunction firing point more rapidly, and the delay angle for the silicon controlled rectifiers 235 and 237 will be reduced accordingly.

As previously mentioned, the firing of unijunction 231 causes a voltage pulse in primary 232 of transformer 233 and voltage pulses are induced in secondary windings 234 and 236 of transformer 233. The two secondary windings 234 and 236 are, respectively, connected across the gate electrodes and the cathodes of silicon controlled rectifiers 237 and 235. When the silicon controlled rectifiers alternately conduct, the AC input voltage is impressed across primary winding 230 of transformer 239 at a time determined by the delay angle. The stepped-up secondary voltage appearing across secondary winding 238 of transformer 239 is full-wave rectified by full-wave rectifier bridge 260, as hereinbefore explained. Node 274 of full-wave rectifier bridge 260 is connected to ground while output node 270 is connected via conductor 272 to node 202. There is, therefore, an incremental constant charging of capacitor 201 from the current flowing in conductor 272 until capacitor 201 is fully charged. The series combination of capacitor 271 and resistor 273 connected in parallel with the silicon controlled rectifiers ensures that they will turn on under existing load conditions and also protects the silicon controlled rectifiers from voltage transients.

Regulator 299 comprises transistor 223, which is normally saturated, while capacitor 201 is being charged. The emitter of transistor 223 is connected to node 254, which is held at a substantially constant voltage. When capacitor 201 initially starts its charging cycle the base to emitter junction of transistor 223 is forward biased. The voltage divider comprising resistor 211 and variable resistor 213 determines the base current of transistor 223 during the charging cycle. Resistor 211 is connected from node 202 to the base of transistor 223 and variable resistor 213 is connected from the base of transistor 223 to ground. As the voltage appearing across capacitor 201 at node 202 increases the base current of transistor 223 decreases. When capacitor 201 is charged to the predetermined value variable resistor 213 is adjusted so that the voltage on the base of transistor 223 is more positive than the emitter voltage and as a result transistor 223 turns off. When transistor 223 turns off its collector voltage decreases, thereby forward biasing previously reverse biased diode 221 whose cathode is connected to the collector of transistor 223 and whose anode is connected to the emitter of unijunction 231. With diode 221 forward biased the emitter of unijunction 231 has only a minute positive voltage on it, that can be considered essentially at ground potential. This small voltage is insufficient to fire unijunction 231, thereby inhibiting any further charging of capacitor 201. Resistor 217 is the conventional load resistor for transistor 223 and is connected from the collector of transistor 223 to ground.

Connected across capacitor 201 is discharge circuit 301 comprising trigger circuit 295, transformer 289 and flashtube 285. The trigger circuit may be of many different types such as one of the type described in United States Letters Patent No. 2,478,901, issued to Harold Edgerton on Aug. 16, 1949. Primary winding 293 of transformer 289 receives periodic trigger pulses from trigger circuit 295 via conductor 294. Secondary winding 291 of transformer 289 is connected at one end to ground, as is one end of both the trigger circuit and primary winding 293, and the other end of secondary winding 291 is connected to cathode 283 of flashtube 285. Anode 281 of flashtube 285 is connected to node 202 as is the trigger electrode 287. Normally the potential across flashtube 285 is insufficient to break down the flashtube until a trigger pulse is applied. When this occurs a voltage pulse is induced in secondary winding 291 causing flashtube 285 to fire, thereby discharging capacitor 201. Once flashtube 285 has fired the process of chargng capacitor 201 commences again.

Typical circuit component types or values are as follows:

| Components: | Type or value |
| --- | --- |
| Diodes 243, 245, 247, 249 | 1N486B |
| Resistor: | |
| 244 | 2.7K |
| 251 | 1K |
| Diodes 255, 257, 253, 227 | 1N486B |
| Zener diode 259 | 1N968 |
| Capacitor 261 microfarads | 25 |
| Unijunction 231 | 2N1671B |
| Resistors: | |
| 229 ohms | 180 |
| 225 megohms | 1 |
| Capacitor 219 microfarads | 0.25 |
| Diode 221 | 1N486B |
| Resistors: | |
| 217 | 5.6K |
| 213 | 32K |
| 211 megohms | 4 |
| 205 do | 4.5 |
| Diodes 263, 265, 267, 269 | SCBR–50 |
| SCR's 235, 237 | 2N688 |
| Capacitor 271 microfarads | 0.5 |
| Resistor 273 ohms | 10 |

While there has been described what is presently considered the preferred embodiments of the invention, it should now be obvious to those skilled in the art that various other changes and modifications may be made therein without departing from the inventive concept contained herein, and it is, therefore, aimed to cover all such other changes and modifications that may fall within the true spirit and scope of the invention.

The invention claimed is:

1. An electric power supply system comprising:
polyphase AC input terminals;
a polyphase power transformer having a plurality of primary windings and a plurality of secondary windings having one winding connected with its output phase reversed with respect to the other secondary windings to compensate for an unbalanced AC input;
a load circuit comprising
a plurality of rectifiers connected to the secondary windings respectively and capacitor means having a positive potential section and a negative potential section connected to be charged through the rectifiers;
a plurality of controlled rectifiers, the primary windings of the transformer being connected in series with the AC input terminals, respectively, and with the controlled rectifiers, respectively, with the same polarity, each of the controlled rectifiers having a reverse polarity rectifier connected across it to provide a current return path for other controlled rectifiers;
means for controlling the controlled rectifiers to vary their conductivity angle in response to a condition of the load circuit comprising
a plurality of timing circuits connected to the controlled rectifiers for controlling their conductivity in accordance with a timing cycle,
means for establishing an initial timing cycle n the timing circuits when the capacitor means is not charged, and
means for modifying the timing cycle of the timing circuits in response to the charge upon the capacitor means; and
means for modifying the operation of the timing circuits to prevent conduction of the controlled rectifiers upon occurrence of a predetermined potential unbalance between the capacitor sections.

2. The system of claim 1 further comprising means for modifying the operation of the timing circuits to prevent conduction of the controlled rectifiers when the capacitor means has been charged to a predetermined level.

3. The system of claim 1 further comprising means responsive to the discharging of the capacitor means for modifying the operation of the timing circuits to prevent conduction of the controlled rectifiers for a predetermined period of time thereafter.

4. A power supply system for controlling the charging of capacitor means from a source of AC comprising:
electric switch means and rectifier means connected in circuit with the source and the capacitor means;
a timing circuit for controlling the conductivity of the switch means;
means connected to the source for controlling the timing circuit to provide an initial timing cycle when the capacitor means is not charged;
feedback means connected to the capacitor means for modifying the timing cycle to vary the time at which the switch means is rendered conductive as the capacitor means charges; and
a regulator circuit for controlling the timing circuit having
means responsive to a predetermined charge upon the capacitor means for modifying the operating condition of the timing circuit to prevent the switch means from conducting, and
means responsive to the discharging of the capacitor means for maintaining the timing circuit in the modified condition for a predetermined time thereafter.

5. A power supply system as in claim 4 in which:
the capacitor means has a positive section and a negative section, and
the regular circuit has means for comparing the potentials upon the sections and means for modifying the operating condition of the timing circuit for preventing the switch from conducting when a predetermined potential difference exists between the sections.

6. The system of claim 5 in which:
the feedback means is responsive to the charge upon one of the sections; and
the regulator circuit is responsive to the charge upon the other section.

7. A power supply system for controlling the charging of capacitor means from a source of AC comprising:
electric switch means comprising a gated semiconductor device and rectifier means connected in circuit with the AC source and the capacitor means;

a transformer having a primary winding connected in series with the AC source and the gated semiconductor device and having a secondary winding connected to the capacitor means through the rectifier means;

a timing circuit comprising a relaxation oscillator having a unijunction transistor and a timing capacitor for controlling the conductivity of the switch means;

means connected to the AC source for controlling the timing circuit to provide an initial timing cycle when the capacitor means is not charged comprising a voltage level-setting Zener diode for establishing an initial current level into the timing capacitor; and feedback means connected to the capacitor means for modifying the timing cycle to vary the time at which the switch means is rendered conductive as the capacitor means charges comprising means for modifying the current applied to the timing capacitor in response to the charge upon the capacitor means.

8. An electric flash-producing system comprising:

an electric flash discharge device having a pair of principal electrodes and a trigger electrode;

capacitor means having a positive section and a negative section connected across the principal electrodes;

trigger circuit means connected to the trigger electrode for causing the capacitor means to discharge through the discharge device; and a power supply for charging the capacitor means, the power supply having a transformer with a plurality of primary windings and with a plurality of secondary windings connected to the capacitor means by full wave rectifiers with one of the secondary windings connected with its output phase reversed with respect to the other secondary windings to compensate for an unbalance AC input, a plurality of AC input terminals, a plurality of similarly poled controlled rectifiers, each bridged by an oppositely poled additional rectifier, each of the controlled rectifiers being connected to one of the input terminals through a corresponding primary winding and being connected to the others of the input terminals through the oppositely pole rectifiers and the other primary windings, a plurality of timing circuits connected to the controlled rectifiers, respectively, for rendering the same conductive, means establishing an initial timing cycle in the timing circuits for setting the initial conductivity times of the controlled rectifiers, means connected to the capacitor means for modifying the timing cycle as the capacitor means charges in order to modify the conductivity times of the controlled rectifiers, and a regulator circuit having means for controlling the timing circuits to prevent the controlled rectifiers from conducting when one of the capacitor sections has charged to a predetermined potential, the means for modifying the timing cycle in the timing circuits being responsive to the potential of the other of the capacitor sections, and means for comparing the potentials of the sections for controlling the timing circuits to prevent the controlled rectifiers from conducting when a predetermined difference exists between the potentials of the capacitor sections.

9. In a system in which the rate of charging a plural-section capacitor means from a power supply is controlled by a feedback circuit from the capacitor means, regulator means coupled to the feedback circuit for controlling the power supply, the regulator means comprising:

a semiconductor relay comprising a two-stage amplifier with regenerative feedback which, when actuated, turns off the power supply;

circuit means connected between the capacitor means and the input of the first stage of the amplifier for actuating the relay in response to charging of the capacitor means to a predetermined level;

means comprising a circuit connected between the capacitor means and the input of the second stage of the amplifier for maintaining the relay actuated for a predetermined time after discharging of the capacitor means; and means comprising circuits connected from the capacitor sections to the input of the second stage of the amplifier for actuating the relay in response to a predetermined potential difference between the capacitor sections.

References Cited

UNITED STATES PATENTS

| | | | |
|---|---|---|---|
| 1,867,503 | 7/1932 | Fitz et al. | 321—5 |
| 3,105,920 | 10/1963 | Dewey | 317—33 X |
| 3,114,098 | 12/1963 | Rallo et al. | 321—18 |
| 3,176,215 | 3/1965 | Kusko | 323—24 |
| 3,189,810 | 6/1965 | MacGregor | 318—227 |
| 3,197,691 | 7/1965 | Gilbert | 321—18 |
| 3,289,069 | 11/1966 | Todd | 321—18 |
| 3,332,008 | 7/1967 | Mueller et al. | |

FOREIGN PATENTS 1,263,652  5/1961  France.

JOHN F. COUCH, Primary Examiner.

A. D. PELLINEN, Assistant Examiner.

U.S. Cl. X.R.

320—1; 321—5; 315—141, 194, 205, 206, 224, 279, 307; 323—24, 38